United States Patent [19]

Lewis et al.

[11] 4,040,336

[45] Aug. 9, 1977

[54] CUTTING OR GRINDING TOOL PROTECTING GUARD

[75] Inventors: Terence John Lewis, Rugby; Raymond Brooks, Exhall, near Coventry; John Selby, Coventry, all of England

[73] Assignee: The Torrington Company Limited, Coventry, England

[21] Appl. No.: 676,525

[22] Filed: July 26, 1976

[51] Int. Cl.² .................. B23Q 11/06; B27G 19/02
[52] U.S. Cl. ............................. 90/11 R; 51/68; 144/251 R
[58] Field of Search .......... 51/68; 144/251 R, 251 A, 144/251 B, 252 R; 90/11 R; 29/DIG. 58, DIG. 59, DIG. 60

[56] References Cited

U.S. PATENT DOCUMENTS

| | | | |
|---|---|---|---|
| 1,206,539 | 11/1916 | Hunsicker | 144/251 R |
| 1,241,588 | 10/1917 | Wallace | 144/251 R |
| 2,487,277 | 11/1949 | Siftar | 29/DIG. 58 |
| 2,895,518 | 7/1959 | Rhett | 144/251 A |

Primary Examiner—Othell M. Simpson
Assistant Examiner—W. D. Bray
Attorney, Agent, or Firm—Frank S. Troidl

[57] ABSTRACT

A protective guard for a machine tool system including a cutting or grinding member which is movable from a first position wherein access to the cutting or grinding member is barred to a second position wherein the cutting or grinding member is exposed.

4 Claims, 7 Drawing Figures

CUTTING OR GRINDING TOOL PROTECTING GUARD

This invention concerns a protective guard for a cutting or grinding member of a machine tool such as a milling machine.

It is an object of the present invention to provide a simple and inexpensive protective guard for use with machine tools.

According to the present invention there is provided a protective guard for a cutting or grinding member of a machine tool, said guard comprising a shield, means for mounting said shield on a machine tool with said shield pivotally movable between a first guard, position wherein access to the cutting or grinding member is barred and a second, access position wherein said cutting or grinding member is exposed; and abutment means on said shield for pivoting said shield between said two positions responsive to workpiece advancing and retracting movements of the machine tool.

Preferably, the shield is in the shape of a generally semi-cylindrical trough.

Conveniently, the means for mounting the shield on the machine tool comprises bearing sleeve means engageable over a shaft of said cutting or grinding member, said bearing sleeve means including readily detachable or operable components for facilitating quick mounting and demounting of said shield.

The abutment means may comprise at least one axially directed, radial projection on the shield, the projection preferably also acting under its own weight so as to bias the shield toward the guard position.

The invention includes within its scope, a milling machine or other machine tool incorporating a protective guard as described in the preceding paragraphs hereof.

The invention will now be described further by way of example with reference to the accompanying drawings, in which.

Figure 1:
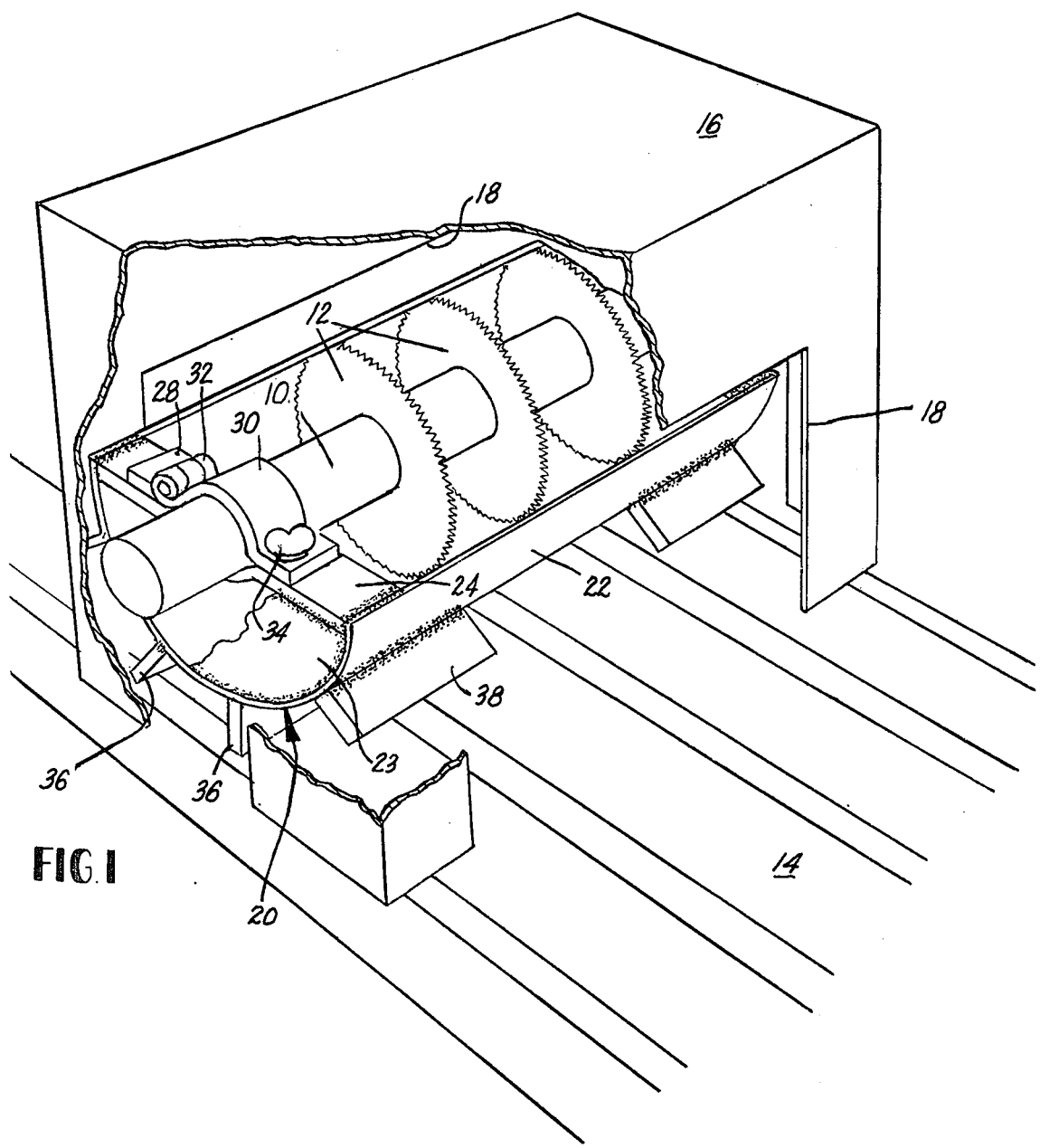
FIG. 1 is a perspective view of a part of a milling machine fitted with a protective guard embodying the invention.
Figure 2:
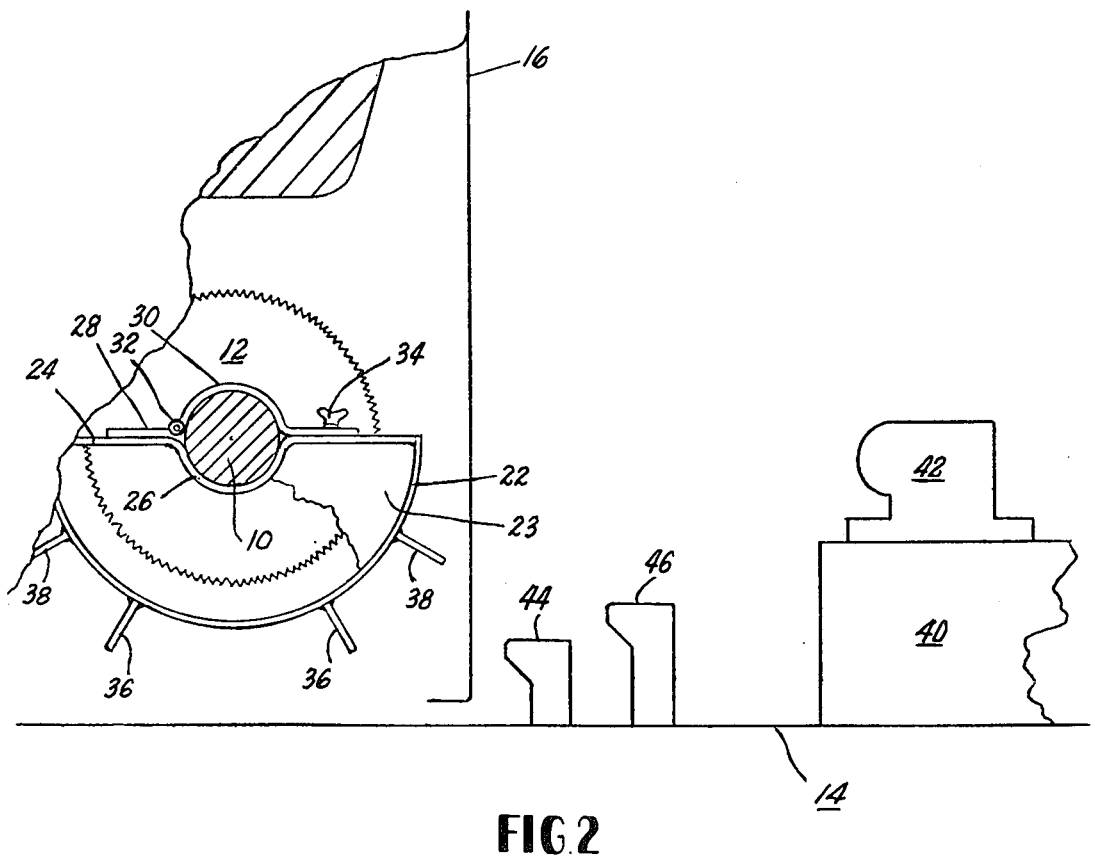
FIG. 2 is an end view of a part of the milling machine depicted in FIG. 1, with parts removed for clarity.

Referring to FIGS. 1 and 2 of the drawings there is shown a milling machine having milling cutters 12 carried on a shaft 10 extending over a machine bed 14. With the exception of access apertures 18, the cutters are enclosed within a housing 16. A protective guard 20 includes a shield 22 which is in the form of a trough having end plates 23 and is semi-circular in cross-section. The shield 22 is pivotally mounted at each end of the shaft 10 by means of a sleeve bearing assembly comprising a generally diametrically extending, lever bearing member 24 having a centrally situated, shaft-receiving recess 26, (see FIG. 2) and an upper bearing member 28 which is complementarily recessed at 30. To enable the guard 20 to be quickly mounted on or removed from the shaft 10, the upper bearing member 28 is pivotally connected by hinge means 32 to the lower bearing member 24 at one side of the shaft receiving recesses 26, 30 and a quick release fastener 34 of any convenient type is provided at the diametrically opposite side of said recesses. The shield 22 is made of sheet metal and to its outer surface are spot welded a number of circularly spaced, axially parallel, radial projections 36 and 38 which act under their own weight to maintain the shield in its pivotally lowermost position to the shaft 10 unless it is deliberately displaced therefrom. It will be seen that, in that position, the diametrical side regions of the shield 22 are effective to bar access to the cutters 12 through the openings 18.

As will be appreciated, workpiece access to the milling cutters 12 is by way of the access openings 18 and by pivotal displacement of the shield 22 to expose the cutters to the workpiece. For this purpose, it is convenient to use means related to the workpiece advancing and retracting motion of the machine tool with which the guard 20 is intended to cooperate; and by way of example, FIG. 2 illustrates a workpiece holder 40 carrying a workpiece 42, and separate pusher members 44 and 46 slidable along the machine bed 14 in concert with the workpiece holder 40. The primary pusher 44 is intended to coact with the radial projection 36 while the secondary pusher 46 cooperates with the radial projection 38.

The workpiece holder 40 is vertically movable in order to compensate for wear in the cutters 12; and to ensure that the primary pusher 44 does not jam the shield 22, that pusher may also be vertically adjustable.

Figure 3:
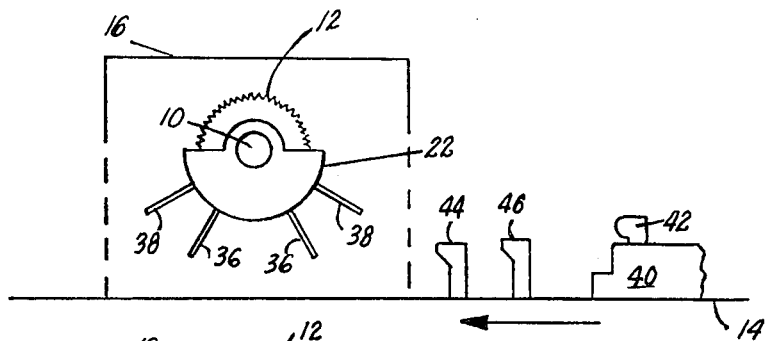
FIGS. 3 to 7 are diagrammatic end views of the milling machine, to a smaller scale and showing the various stages in a typical milling operation.

Referring now to FIGS. 3 to 7, it can be seen that before commencing the milling operation, the shield 22 is in such a position as to protect an operator from the cutters 12 (FIG. 3).

Figure 4:
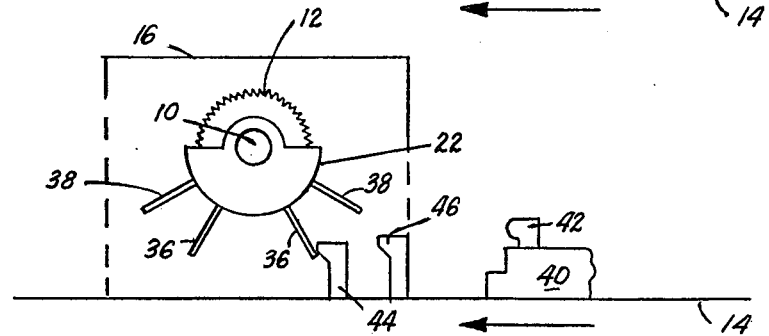
Figure 5:
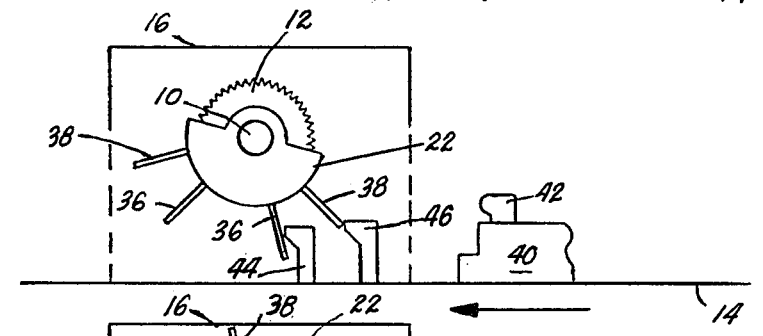

When the workpiece 42 and the workpiece holder 40 are moved towards the cutters 12 of the milling machine, the primary pusher 44 contacts the radial projection 36 on the outer surface of the shield 22 (FIG. 4). On moving the workpiece 42 further towards the cutters, (FIG. 5), the primary pusher 44 displaces the projection 36 and hence pivots the shield 22 about the shaft 10 on which the cutters are mounted. The rotation of the shield 22 produced by this displacement of the projection 36 is, however, insufficient to fully expose the cutters 12.

Figure 6:
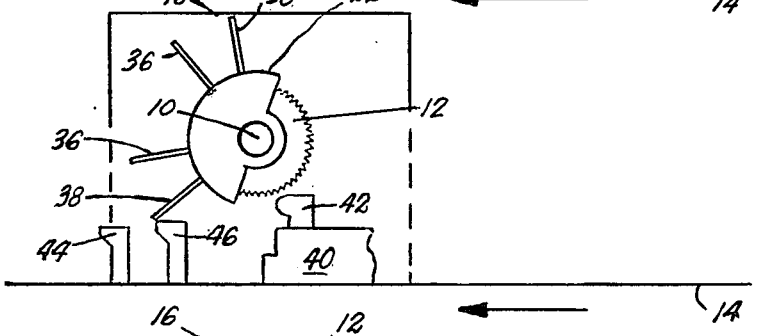

A further pivoting of the shield is necessary in order to fully expose the cutters to the workpiece and workpiece holder towards those cutters (FIG. 6). In this stage of the operating sequence, the secondary pusher member 46 contacts the following radial projection 38, resulting in further pivoting of the shield 22 about the shaft 10. The cutters 12 are now fully exposed to the workiece 42 and by an appropriate movement of the workpiece holder 40, either in a direction parallel to the longitudinal axis of the shaft 10 and/or in a direction perpendicular to that axis, the workpiece may be milled as required.

Figure 7:
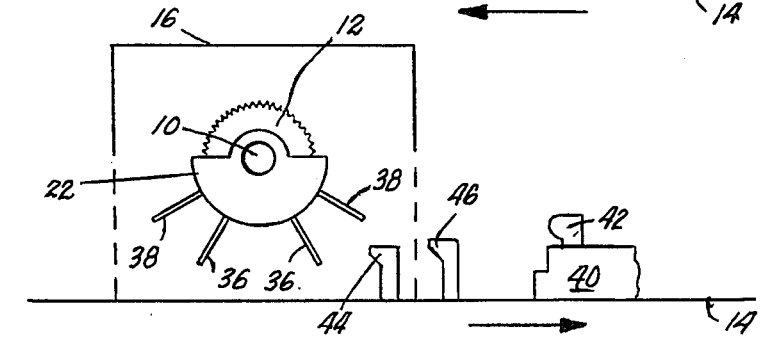

At the end of a single milling operation the workpiece 42 and workpiece holder 40 are withdrawn from contact with the cutters 12, and the radial projections 36 and 38, as previously mentioned, act under their own weight to return the shield to a position in which access to the cutters is closed off (FIG. 7).

A further cutting operation may be performed by carrying out the above described procedures from the opposite side of the machine, by way of the further access opening 18 provided for that purpose.

Although the illustrated embodiment of the invention shows separate pusher members 36 and 38 mounted on the machine bed independently of the workpiece carrier 40, any other similarly acting pusher members may be employed, and may, for example, take the form of forwardly directed projections carried by the workpiece holder 40.

The guard provided by the invention is simple and inexpensive in its construction, which is largely of spot welded sheet metal, and is readily mounted on or removed from the machine tool, as required. The same simplicity of construction and mounting further makes for a long service life and reliable operation.

We claim:

1. A protective guard for a cutting or grinding member of a machine tool, said guard comprising a sheet metal shield defining a trough of generally semi-cylindrical configuration, means for mounting said shield on a machine tool with said shield pivotally movable between a first, guard position wherein access to the cutting or grinding member is barred and a second, access position wherein said cutting or grinding member is exposed; and a plurality of circularly spaced, radial projections on said shield for pivoting said shield between said two positions responsive to workpiece advancing and retracting movements, said workpiece being held in a holder mounted for movement on said machine tool.

2. A guard in accordance with claim 1 wherein the means for mounting the shield on the machine tool comprises bearing sleeve means engageable over a shaft of said cutting or grinding member, said bearing sleeve means including readily detachable or operable components for facilitating quick mounting and demounting of said shield.

3. A guard in accordance with claim 2 in which said bearing sleeve means comprises, at each end of the shield, a generally diametrically extending, lower bearing member having a centrally situated, shaft-receiving recess for cooperating with a tool carrying shaft of said machine tool, a complementary recessed upper bearing member pivoted to said lower bearing member at one side of the recess and quick release fastening means securing said bearing members together at the opposite side of said recesses.

4. A machine tool system comprising: a protective guard for a cutting or grinding member, a generally semi-cylindrical shield, means for mounting said shield on the machine tool with said shield pivotally movable between a first guard position wherein access to the cutting or grinding member is barred and a second access position wherein said cutting or grinding member is exposed, a plurality of circularly spaced, radial projections on said shield, a workpiece holder mounted on said machine tool and being movable toward and away from said sheild, and pusher members movable in concert with the advancing and retracting movements of the workpiece holder and cooperating with the radial projections on said shield to pivot said shield for exposing the tools on said shaft to an approaching workpiece.

* * * * *